United States Patent [19]

Kuwabara et al.

[11] Patent Number: 5,228,802
[45] Date of Patent: Jul. 20, 1993

[54] UNDERGROUND DRAINAGE FACILITY AND OPERATION METHOD THEREFOR

[75] Inventors: Norimitu Kuwabara, Ibaraki; Kenji Otani, Tsuchiura, both of Japan

[73] Assignee: Hitachi, Ltd., Tokyo, Japan

[21] Appl. No.: 896,995

[22] Filed: Jun. 11, 1992

[30] Foreign Application Priority Data

Jun. 11, 1991 [JP] Japan .................................. 3-139165

[51] Int. Cl.$^5$ .............................................. E02B 13/00
[52] U.S. Cl. ........................................ 405/41; 405/36; 405/40; 405/52
[58] Field of Search ...................... 405/36, 43, 45, 39, 405/37, 48, 50, 41, 40, 52; 137/236.1, 363; 52/169.5; 210/170

[56] References Cited

U.S. PATENT DOCUMENTS

4,457,646 7/1984 Laesch .............................. 405/36 X
4,934,404 6/1990 DeStefano .................... 137/236.1 X
4,997,312 3/1991 Regan ................................. 405/36 X Primary Examiner—Dennis L. Taylor
Attorney, Agent, or Firm—Antonelli, Terry, Stout & Kraus

[57] ABSTRACT

A drainage system comprises a drainage passage for a drain water, a pump for pumping up the drain water from the drainage passage to a drain portion which is arranged above the drainage passage, and a storage tank which has an inlet connected to the drainage passage to receive the drain water therethough from the drainage passage into the storage tank, and a height of the inlet is higher than that of the drainage passage and lower than that of the drain portion so that an ascent of upper surface of the drain water from the drainage passage is restrained after the drain water ascends to the inlet from the drainage passage.

15 Claims, 6 Drawing Sheets

UNDERGROUND DRAINAGE FACILITY AND OPERATION METHOD THEREFOR

BACKGROUND OF THE INVENTION

The present invention relates to an underground drainage facility for gathering flowing water such as, for example, rain water and the like, which has flowed from water channels including creeks, into a main underground inlet or input conduit, with the flow then being introduced into a drain pump installation so as to enably discharge to a determined drain portion such as a river or the like, and, more particularly, to an underground drainage facility for a wide area drainage facility in a city and suburbs, and with the underground drainage facility including reservoirs for storing inflowing drainage water.

Since the amount of paved surface area in cities and suburbs has considerably increased, the proportional amount of rain water which would have, in the past, penetrated into the surface of the earth decreases and, consequently, the quality of flowing water in the underground drainage facility increases in a very short time period. In order to cope with the increase in the quantity of flowing drainage water, a variety of countermeasures have been taken such as, for example, a diameter of the main inlet or input conduit of the underground drainage facility has been increased with a number and/or capacity of drain pumps have also been increased. Furthermore, there has been a tendency toward a very deep underground drainage installation, with the main inlet or input conduit being laid deep in the earth in order to sufficiently increase the hydraulic radiant. By the term "very deep" as used herein is meant an underground space surrounded by a 30 to 50 m or deeper hard ground free of any influences of upper structures.

In very deep underground drainage facilities having the main input or inlet conduit laid deep underground, it is feasible to cause the main inflow conduit to have a water storage effect by forming reservoirs at the same level or depth or at a level deeper than that of the main inlet or input conduit or by enlarging the cross-sectional area of the main input conduit so as to cope with a temporary increase in the quantity of the inflowing water.

However, the very deep underground drainage facility having reservoirs at a level deeper than that of the main input conduit, and with the main input conduit being capable of enabling a water storage, suffers from the disadvantage that the input or inlet vertical shaft establishing a connection between the water channels formed on the surface of the earth and the main inlet or input conduit has only a small storage capacity. Therefore, the operation of the drain pump must begin before the downstream side of the main inlet or input conduit is filled with water. Accordingly, the required water pressure head for the pump must be must be raised in accordance with the depth of the buried main inlet or input conduit, causing the energy cost and cost of installation to be increased as well as increasing the size of the facility thereby resulting in an uneconomical installation.

The increasing of the diameter of the main input or inlet conduit and the forming of the water reservoir deep underground increases the amount of necessary excavation work to be performed at a very deep location. Therefore, problems arise in labor effectiveness, the length of the required construction time, and excessively high construction costs.

SUMMARY OF THE INVENTION

An object of the present invention is to provide a drainage system including drainage passage means for a drainage water and pump means for pumping up the drainage water from the drainage passage means to a drain portion, in which system a pumping performance is small and an overflow of the drainage passage means is prevented.

According to the present invention, a water drainage system comprises drainage passage means for enabling a drainage of water, with pump means pumping the drainage water from the drainage passage means to a drain portion arranged above the drainage passage means, and with a storage means having an inlet means connected to the drainage passage means to receive the drainage water through the drainage passage means into the storage means. A height of the inlet means is higher than a level of the drainage passage means and lower than a level of the drain portion.

Since the height of the inlet means is higher than the height of the drainage passage means and lower than the height of the drain portion, a rising of upper surface of the drainage water from the drainage passage means is prevented and a pump head of the pump means is formed between the drain portion and the inlet means after the drainage water rises to the inlet means from the drainage passage means. Therefore, a pumping pressure and the maximum instantaneous pumping flow rate of the pump means may be small to prevent the overflow of the drainage passage means.

DESCRIPTION OF THE PREFERRED EMBODIMENTS

Preferred embodiments of the present invention will now be described with reference to the drawings.

Figure 1:
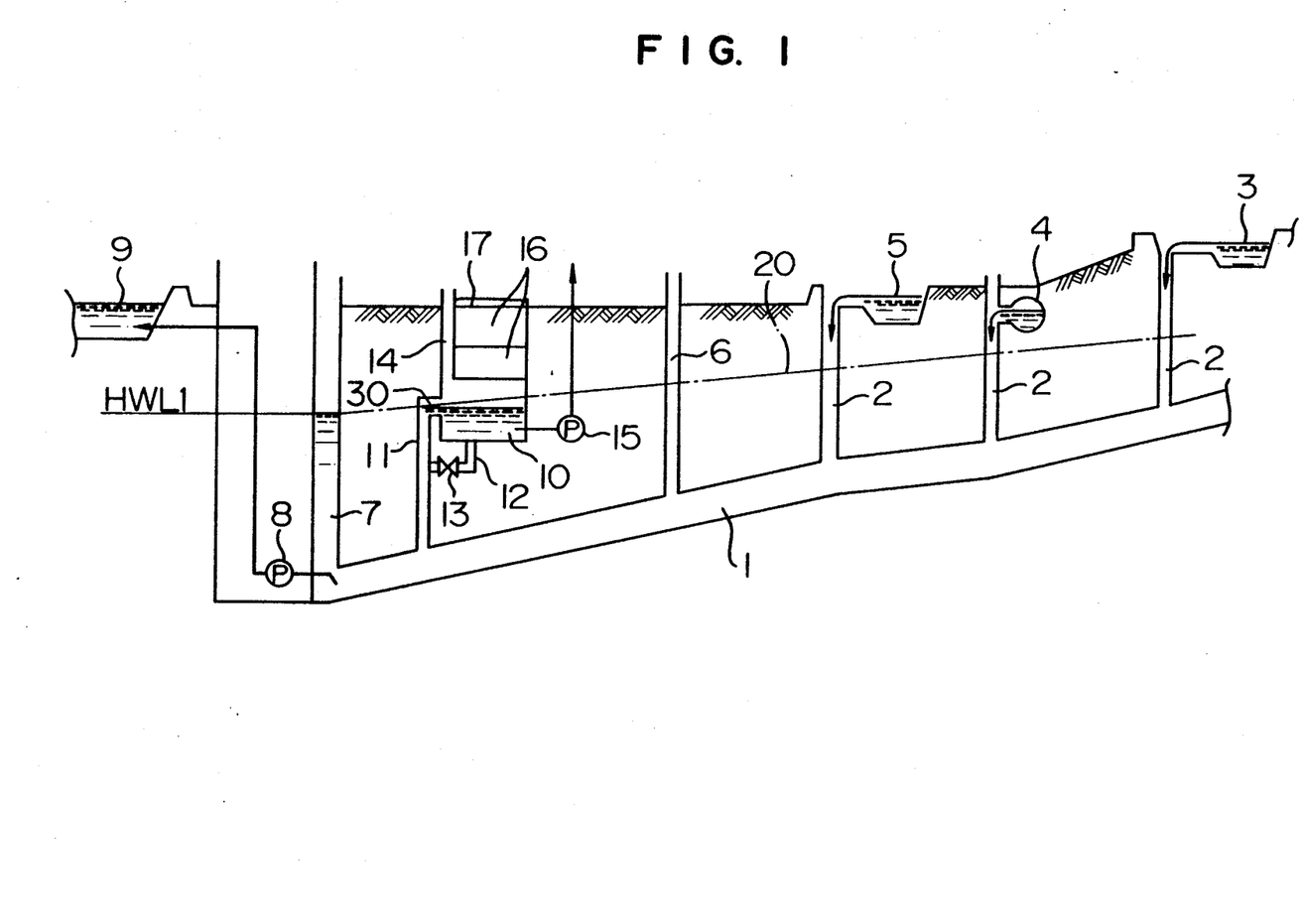
FIG. 1 is a schematic vertical sectional view structure of an embodiment of an underground drainage facility according to the present invention.

In accordance with the embodiment of FIG. 1, a very deep underground drainage facility including a drainage passage having a main input or inlet conduit 1 is embedded under the ground, with rain water or the like flowing into the main conduit 1 from, for example, rivers 3, pipe channels 4, discharge or sewer channels 5, and the like, through water inlet or input shafts 2. The main inflow conduit includes a plurality of air holes 6 communicating with the surface of the earth for providing ventilating air. The lower terminal end of the main conduit 1 communicates with a pump well 7 so as to discharge inflowing water in the pump well 7 to a drain portion such as, for example, a river 9 by a drain pump 8.

An underground reservoir 10 having a predetermined capacity, is embedded downstream from the main conduit 1, with the underground reservoir 10 being disposed at an intermediate position between the surface of the earth and the main conduit 1. The underground reservoir 10 communicates with the main conduit 1 through a communication shaft 11. The communication shaft 11 communicates with the underground reservoir 10 at a communication portion located at a side surface of the reservoir 10, and a level of the inlet 30 is higher than a level of the surface of the bottom of the reservoir 10.

Figure 7:
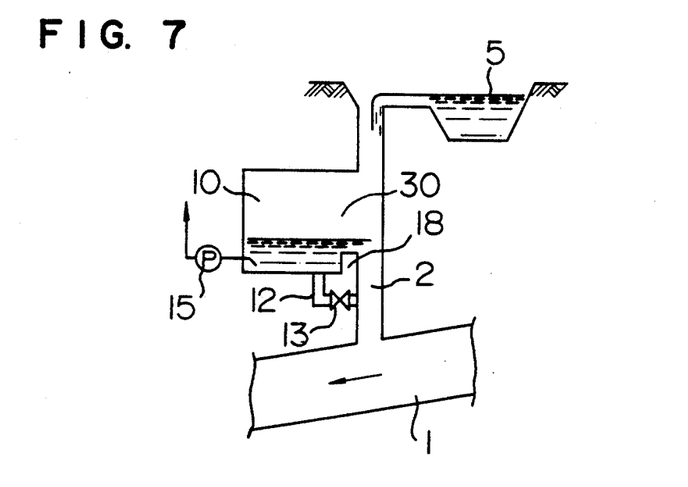
FIG. 7 is a schematic view of another embodiment of a communication shaft for establishing a connection between an underground reservoir and the main inlet or input conduit.
Figure 8:
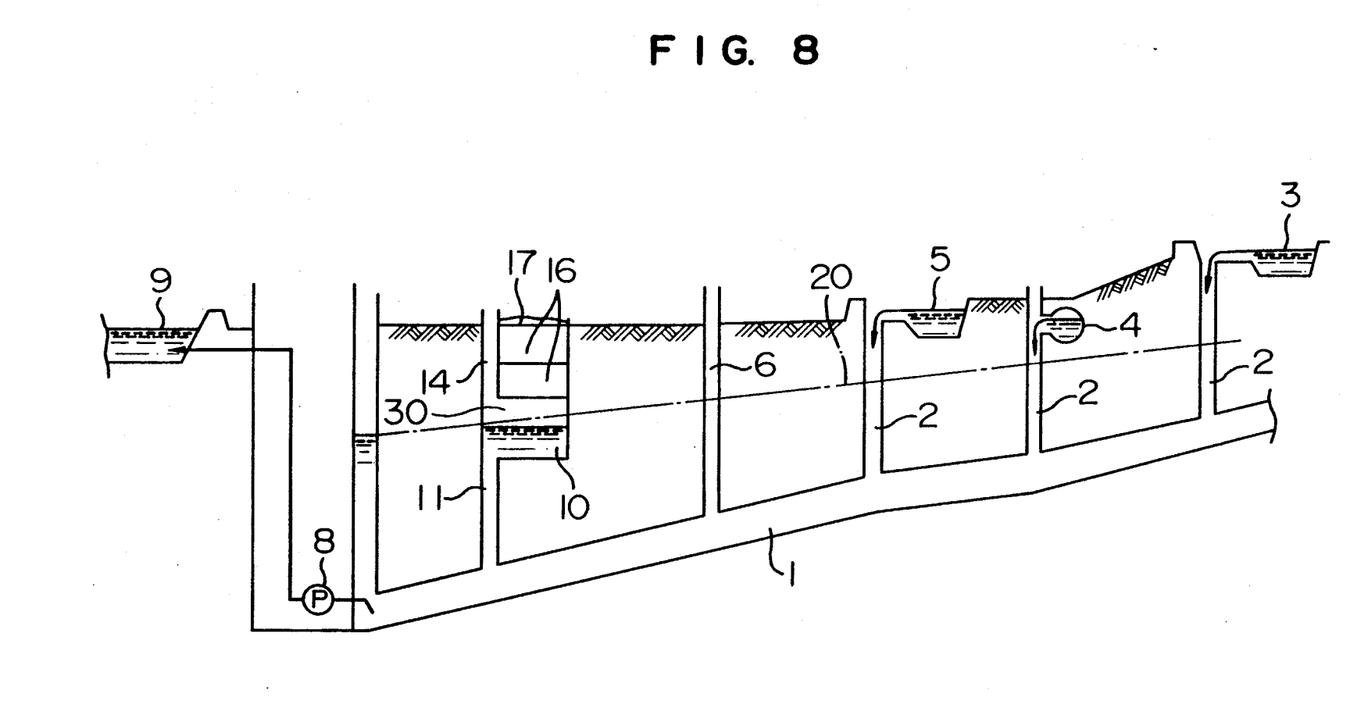
FIG. 8 is a vertical sectional schematic view of another embodiment of the present invention depicting the construction of an underground reservoir.

The level of the inlet may be determined by a height of a dam 18 as shown in FIGS. 7 or 8. The bottom of the underground reservoir is connected to the communication shaft 11 through a discharge conduit 12 for discharging water stored in the underground reservoir 10. The discharge conduit 12 has an opening and closing valve or a gate valve for opening and closing the discharge conduit 12. The discharge conduit 12 may be directly connected to the main conduit 1. A water pump, in communication with the bottom of the underground reservoir 10, is disposed so that stored water can be pumped to the surface of the earth. As a result, stored water can be effectively utilized according to demand as, for example, water for fire extinguishing or general service water to be, for example, watered on a road on in a park. The upper portion of the underground reservoir 10 is opened to the atmosphere through an air or venting hole 14 and, at a public facility such as park 17 or an athletic field, is constituted on the surface of the earth which corresponds to the underground reservoir 10. Furthermore, a facility such as an underground parking area 16 or the like may be provided for utilizing a space between the surface of the earth and the underground reservoir 10.

The capacity of the underground reservoir 10 is larger than a value obtained by subtracting the storage capacity of the main conduit 1 from the required storage capacity determined according to the conditions of the drainage system such as the expected quantity of inflow and the drainage capacity of the drain pump.

The operation and the operation method of the embodiment thus constituted will now be described.

When the level of the river 3 or the like rises in accordance with due to a rainfall, the quantity of water introduced into the main conduit 1 increases and the water level of the main conduit 1 rises in according to the degrees of the amount of rainfall. If a rapid increase in the quantity of an water takes place due to a localized torrential downpour, the main conduit 1 is filled with water and the water level of the communication shaft 11 of the underground reservoir 10 rapidly rises. As a result, the after the water level is raised to the level of the inlet of the underground reservoir 10. When the water level has been raised to the above-mentioned level, the storage effect of the underground reservoir 10 accommodates the ensuing rapid rise of the water level Therefore, a sufficiently long period of time is provided for accommodating the rise in the level of underground water to the pump well 7 to a commencement of the operation of the drain pump 8. That is, even if the operation of the drain pump 8 commence after the water level has been raised to the level of the inlet of the underground reservoir 10, it is possible to prevent an accidental overflow due to a backflow of the inflow of water from the river 3, the pipe channel 4, the discharge channel 5 or the air hole 6.

The total drainage performance of the drain pump 8 is determined according to the estimated quantity of the inflow of the drainage water with, the total drainage performance being usually determined to be a valve in accordance with the quantity of inflowing water per unit time. Therefore, by starting the operation of the drain pump 8 after the water level has been raised to the underground reservoir 10, a rise in the water level can be prevented.

Figure 2:
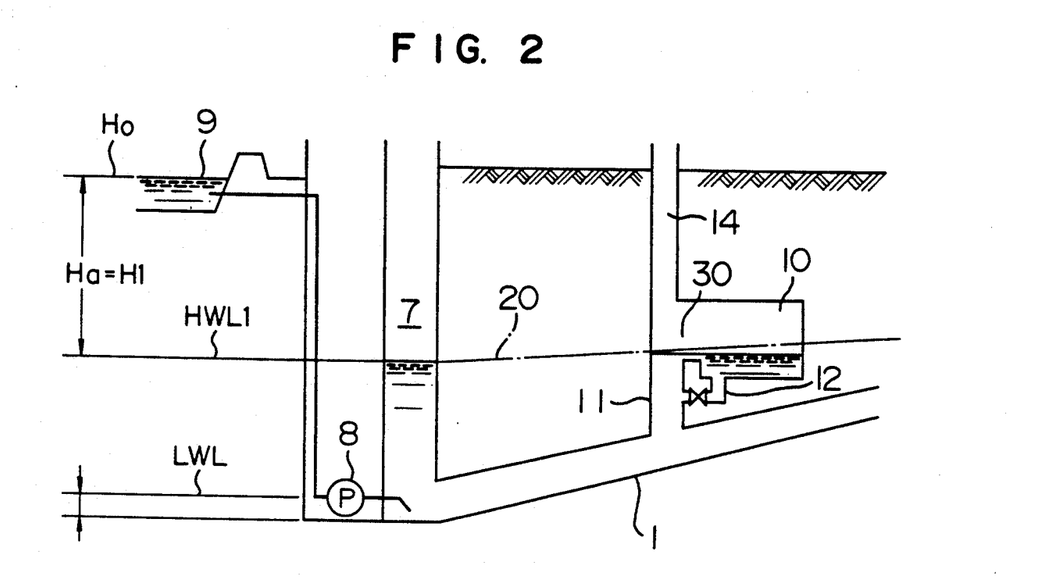
FIG. 2 is a schematic partial view of an depicting an operation of the embodiment of FIG. 1.

Accordingly, permitting the water level at the inlet of the underground reservoir 10 represent a reference water level and the water level of the pump well 7 which corresponds to the reference level represent a pump operation commencement water level HWL, the operational drainage quantity of the drain pump 8 is controlled so as to maintain the aforesaid level. As a result, a major portion of the required drainage quantity for each rainfall can be drained while being raised by a head Ha=H1 which is a difference between HWL1 which corresponds to the level of the inlet of the underground reservoir 10 and water level Mo of the river 9 or the like to which the water is discharge. On the contrary, in a case where the main conduit 1 has a storage capability or an underground reservoir formed at a level at which the main conduit 1 is located, the pump operation commencement level HWL2 must be set to a level which approximates the level realized when the main conduit 1 is filled with water. Therefore, the required head Ha becomes H2. Since it is apparent that H1<H2, the power required to complete the drainage can be reduced and the rated total head Hp of the drain pump 8 can be lowered according to the present invention. Therefore, the installation cost and the size of the facility can be reduced.

If the quantity of the inflow is changed during the control of the drainage quantity while making the inlet level of the underground reservoir 10 to be the reference, level the space of the underground reservoir 10 above the inlet level enable a storage capability so that the change in the inflowing water is absorbed.

If the rainfall stops and the water level of the pump well 7 is lowered to pump stoppage water level LWL, the operation of the drain pump 8 is stopped. Although the required head Ha is increased from H1 to H2 during the above-mentioned process, a required drainage can be performed by properly setting the flow rate head characteristics of the drain pump 8. Although the efficiency of the drain pump 8 is reduced and required operating power is increased in this case, the proportion of this increase can be neglected.

Figure 3:
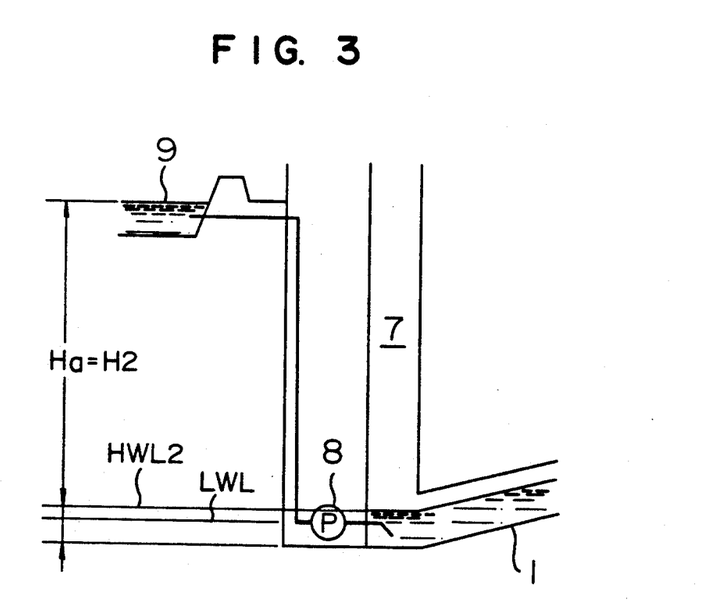
FIG. 3 is a schematic partial view of a comparative example corresponding to FIG. 2 depicting the operation of the embodiment of FIG. 1.
Figure 4:
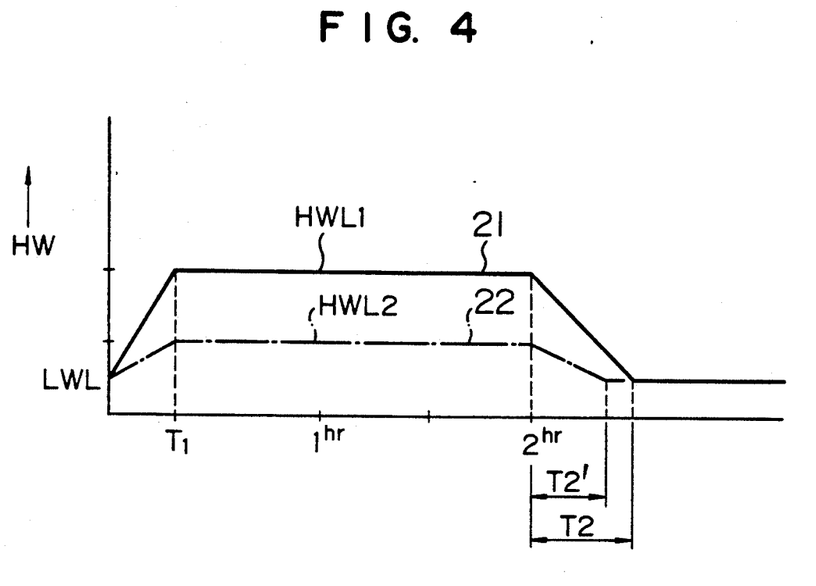
FIG. 4 is graphical illustration of the water level change which takes place in the pump well according to the embodiment of FIG. 1 in contrast with the water level change which takes place in the comparative example of FIG. 3.
Figure 5:
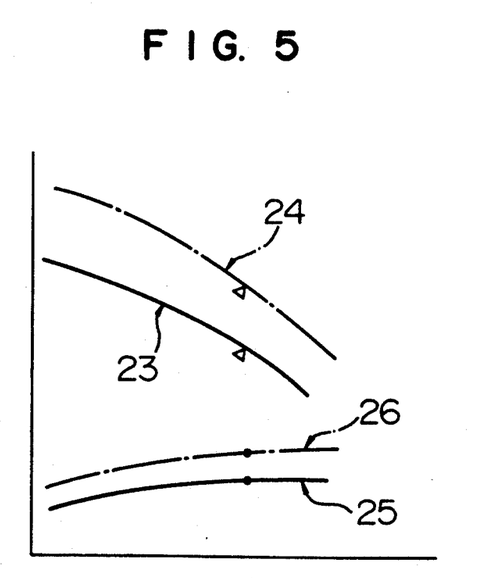
FIG. 5 is a graphical illustration of flow rate-head characteristic curves and flow rate-power characteristic curves of the embodiment of FIG. 1 and the comparative example of FIG. 3.
Figure 6:
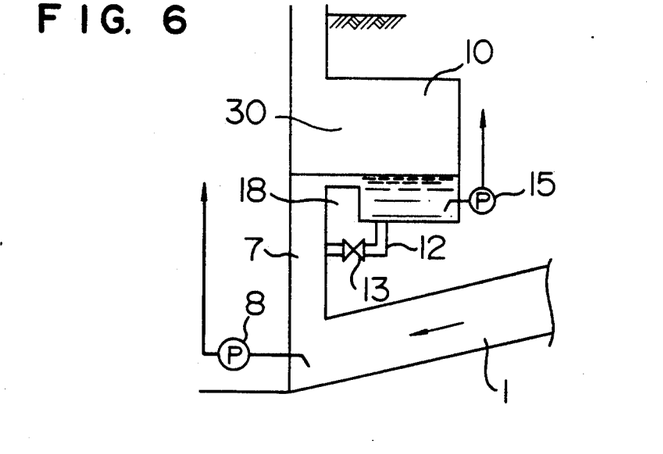
FIG. 6 is a schematic view of a communication shaft for establishing a connection between an underground reservoir and the main inlet or input conduit.

FIG. 4 graphically depicts the manner in which the water level Hw takes place in the pump well 7 from the commencement of the rainfall to the completion of drainage. In FIG. 4 it is presumed that that a rainfall causes a predetermined quantity of of water continues for two hours. A solid line 21 of the graph shows the change in the water level which takes place, while an alternate long and short dash line 22 shows change in the water level which takes place with the comparative example of FIG. 3. In FIG. 4 T1 represents an operation commencement timing of the drain pump 8, and T2 and T2′ represent the stop timing of the drain pump 8. The total quantity of the drainage realized by the drain pump 8 is the same and also the storage capacity is the same in the embodiment of the present invention and the comparative example of FIG. 3. As apparent the graph of FIG. 4, the drainage power for a time (2Hr−T1) can be reduced according to the difference (HWL2−HWL1). The flow rate.head characteristics of the drain pump 8 according to the invention can be reduced as designated by solid line 23 of FIG. 5 as compared with those designated by an alternate long and short dash line 24 according to the comparative example of FIG. 3. Additionally, as shown in FIG. 5, the flow rate.power characteristics of the present invention and the comparative example of FIG. 3 have the relationship designated by a solid line 25 and an alternate long and short dash line 26.

A specific example of the power reduction effect is shown in Table 1 in contrast with the comparative example.

TABLE 1

| Items | Embodiment | Comparative Example |
|---|---|---|
| Main inflow conduit | Diameter: 10 m<br>Length: 4500 m<br>Storage Quantity: about 350,000 m$^3$ | Diameter: 12.5 m<br>Length: 4500 m<br>Storage Quantity: about 550,000 m$^3$ |
| Underground Reservoir | Storage Quantity: about 200,000 m$^3$ | |
| Total discharge from drain pump | 300 m$^3$/S | 300 m$^3$/S |
| Rated total head of drain pump | H1 = 40 m | H2 = 50 m |
| Required power (HWL was made reference) | about 145,000 kW | about 181,000 kW |
| T1 | 0.32 hr | 0.32 hr |
| T2, T2′ | 0.46 hr | 0.35 hr |
| kWH | 145,000 × (2−0.32)<br>+ 135,000 × 0.46<br>305,000 kWH | 181,000 × (2−0.32)<br>+ 178,000 × 0.35<br>366,380 kWH |

This embodiment referenced in Table 1 is constructed in the manner shown and described in connection with FIG. 2, while the comparative example is constructed in the manner shown in FIG. 3. As shown in Table 1, the total storage capacity is the same, but the diameter of the main conduit 1 of the comparative example is larger by the quantity corresponding to the increased diameter. The total drainage quantity coincides with the expected quantity of the inflowing water, and an assumption is made that an inflow water quantity of 300 m$^3$/s continues for two hours. Furthermore, assumptions are made that HWL1=17.5 m, HWL2=7.5 m, and the difference between H1 and H2 is 10 m. Under the aforesaid conditions, there is a tendency for the change in the water level to become as shown in FIG. 4 and T1 becomes 0.32 hr as shown in Table 1. Since the head is changed after the two hour period, drainage is performed while raising water by the average head and the required times T2 and T2′ were obtained from an average drainage quantity (210 m$^3$/s according to the invention and 277.5 m$^3$/s according to the comparative example) of FIG. 3 obtained according to the characteristics shown in FIG. 5. Then, the average power between T2 and T2′ was obtained, resulting in 135,000 kW according to the invention and 178,000 kW according to the comparative example of FIG. 3. As can be understood from this, the total power kWH required to drain the inflow of water to the initial stage becomes the value shown in Table 1 and, therefore a reduction to 83% can be obtained according of the invention as compared with the comparative example of FIG. 3.

Although the above description relates to a construction in which the operation of the drain pump commences at HWL1, as can be appreciated holding a previous operation may be started at a level slightly higher than LWL, resulting in obtaining a storage performance which can be effectively utilized in accordance with particular needs. If the maximum head of the pump is lower than H2, the previous holding operation can be started at a level lower than LWL. That is, since drainage is not performed when the water level is lower than LWL in the aforesaid case, the previous holding operation can be performed while eliminating a need for a special pump having any additional function or the previous holding operation.

Furthermore, according to the invention, the required storage capacity may be secured by adding the storage capacity of the underground reservoir 10 and that of the main conduit 1. Therefore, the diameter (cross sectional area) of the main conduit 1 can be minimized to realize the required flowing performed. Therefore, the volume of the structures required to be constructed deep under the ground can be reduced by a quantity corresponding to the diameter reduction. As a result, a reduction in the necessary excavation to be performed very deep under the ground and reduction of construction can be realized, and the operational feasibility because of inordinate construction time can be overcome.

Furthermore, since a predetermined quantity of water can be stored in the lower portion of the underground reservoir 10, the stored water can be effectively utilized as for example water or general service water for extingushing fire to be, for example, watered on a road or a park. As an alternative to this, the water may be discharged to the main conduit 1 by opening the opening and closing valve 13, resulting whereby the stored water can be utilized to perform the previous waiting operation of the drain pump 8. Therefore, a rise of a problem of dry-operation of a water-cooled bearing which will arise at the time of the previous holding operation can be prevented. In addition to the holding operation, stored water can be utilized as control operation water for use in a maintenance and inspection work or as water for neutralizing contaminated water which will be introduced at the first stage of the rainfall.

Furthermore, the surface of the earth above the underground reservoir 10 can be effectively utilized as the park 17 or the athletic facility and the underground portion above the underground reservoir 10 can be utilized as the parking area 16 or the like. Therefore, a required site can be easily secured.

Alternatively, the underground reservoir may be formed with the independent communication shaft 11 being replaced by a construction in which it is formed with the pump well 7 or the water inlet or input shafts 2. By this approach, the quantity of excavation can be further reduced thereby even further reducing the time for construction as well as the construction costs. Additionally, a predetermined quantity of stored water can be stored by forming a dam 18 at an inlet portion of the underground reservoir 10. Where it is not necessary to effectively utilize stored water, the communication shaft 11 may be connected to the bottom of the underground reservoir 10 resulting in a more simplified construction.

Figure 9:
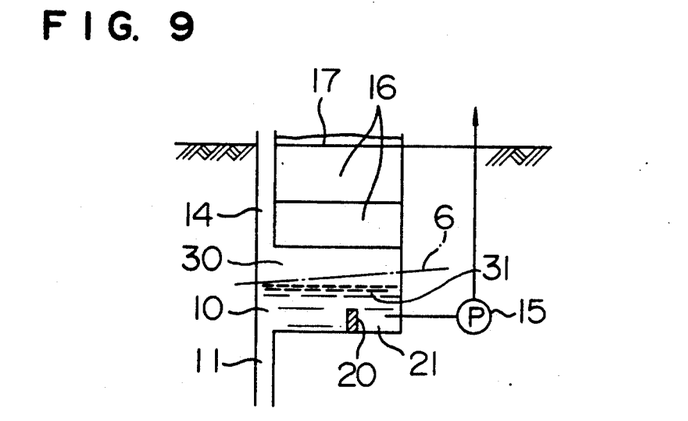
FIG. 9 is a sectional view depicting a portion of an embodiment having a sub-reservoir portion formed in the underground reservoir thereof.

Also as shown in FIG. 9, if a portion of the bottom of the underground reservoir 10 is sectioned by a dam 20, a sub-reservoir 21 can be formed and water stored in the reservoir can be effectively utilized as water for extinguishing fire or general service water to be, for example, watered on a road or a park. An inlet 31 is formed on the dam 20.

Figure 10:
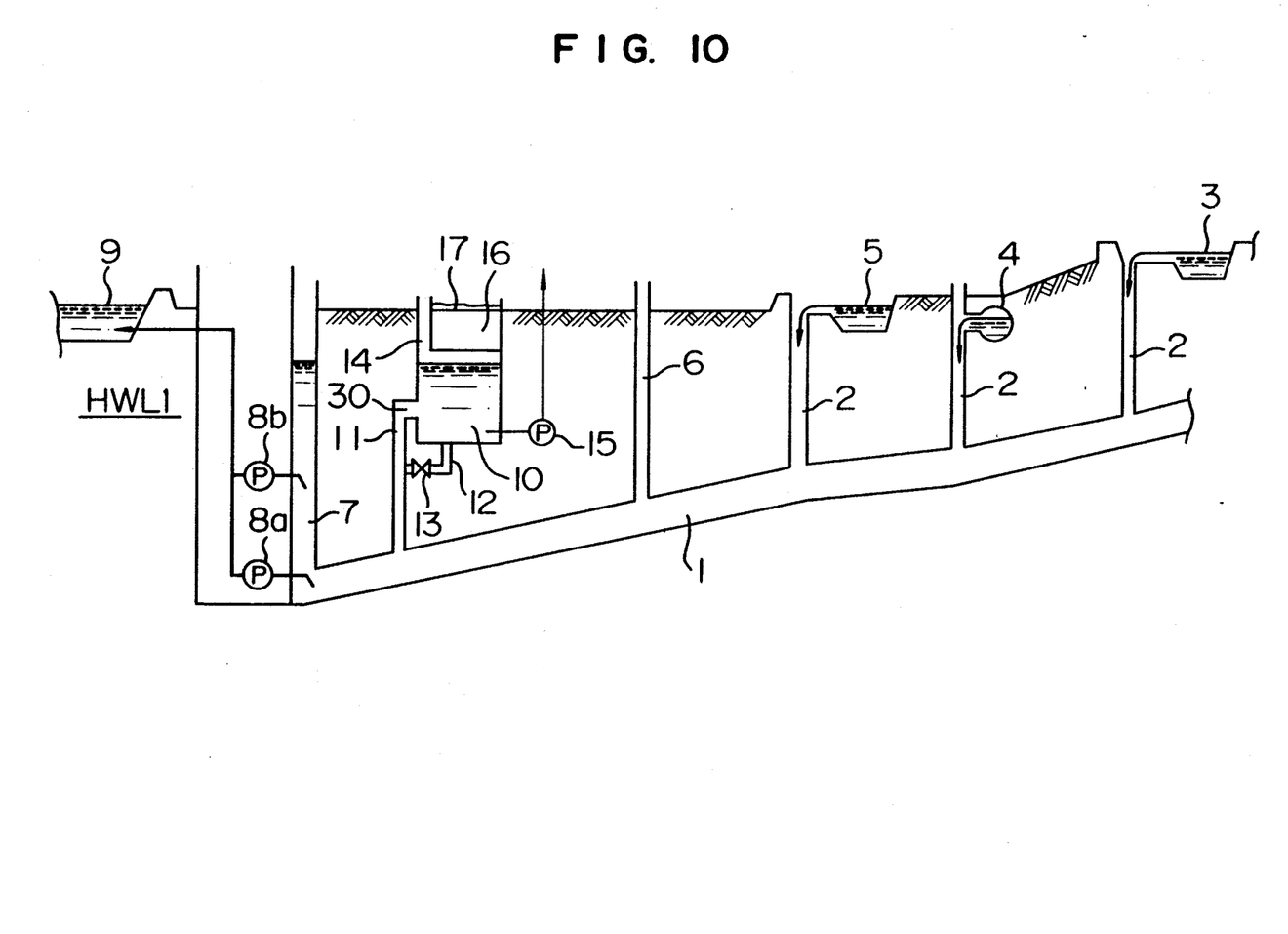
FIG. 10 is a vertical sectional schematic view of another embodiment of the present invention relating to a construction of a drain pump of an underground drainage facility.

In the the drain pump of FIG. 10 in general, if the depth of the buried main inflow conduit 1 becomes deeper, the difference between the lower water level of the pump well 7 and the high water level HWL of the same becomes large. Furthermore, in an underground drainage facility, if the water level of the pump well 7 is low, the quantity of drainage may be reduced. The utilization of drained water may be increased according to the rise of the water level. Accordingly, it is preferable that drain pumps capable of draining the required quantity of water are located in a hierarchail manner as shown in FIG. 10 in which a high-head pump 8a is disposed in the lower hierarchy and a low-head pump 8b is disposed in the upper hierarchy. In this case, the low-head pump 8a must be located at a level at least lower than the bottom level of the underground reservoir 10.

As a result of the thus arranged structure, the difference from water level Ho of the river 9 to which water is discharged can be reduced by a degree realized by raising the drain pump 8b located at the upper hierarchy and the required head can be reduced by the quantity according to it. Therefore, the required power to perform drainage can be reduced. In particular, if the rating of the drain pump 8b located in the upper hierarchy is a low head and of a large capacity and its operation is commenced in accordance with to the rise of the water level, a significantly satisfactory effect can be obtained in reducing the power required to perform drainage because the low head and large capacity pump exhibits an excellent pump efficiency over a wide operational range. In a case where the water level of the pump well 7 is low, it is not necessary to quickly drain water. Therefore, the drain pump 8a located in the low hierarchy must have a high head but its capacity can be reduced.

Furthermore, since a plurality of drain pumps are located at two or more hierarchies, the required area in which the housing for the underground pump can be reduced. As a result, the workload including the underground excavation work can be reduced and the construction costs can also be reduced.

As described above, according to the present invention, the following effects can be obtained.

Since the structure is employed in which the underground reservoir is located between the main inflow conduit and the surface of the earth, a predetermined storage performance can be secured. Furthermore, the level of the reservoir is high, a time from the moment at which the inflow of water reaches the pump well to the commencement of the operation of the drain pump can be sufficiently long. As a result, by controlling the quantity of drainage of the drain pump to maintain the level of the inlet of the underground reservoir which is made as the reference level, the drainage can be performed while lowering the head. Therefore, the power required to drain water can be reduced as compared with a case in which drainage is performed when water level is the same as the level of the main inflow conduit.

Furthermore, since the diameter (cross sectional area) of the main inflow conduit can be minimized to meet the performance of flowing water, the volume of the structure located deep under the ground can be reduced by a quantity according to it. Therefore, the increase in the workload including the excavation work to be performed at a very deep position and that of the construction cost can be prevented.

If the structure is arranged in which a predetermined quantity of water can be, the stored water can be effectively utilized according to demand as water for fire extinguishing or general service water to be, for example, watered on a road or a park. In addition, stored water can be utilized as water for use in the previous holding operation of the drain pump, control operation water for use in a maintenance and inspection work or as water for neutralizing contaminated water which will be introduced at the first stage of the rainfall.

Furthermore, the surface of the earth above the underground reservoir can be utilized to form a park or an athletic facility and the underground portion above the same can be utilized as a parking area or the like.

If the drain pump function is realized by combining low-head pumps and high-head pumps, an effect can be obtained in that the power required to drain water can be reduced.

What is claimed is:

1. A drainage system comprising:
    drainage passage means for drainage water,
    pump means for pumping the drainage water from the drainage passage means to a drain portion arranged above the drainage passage means, and
    storage means including an inlet connected to the drainage passage means to receive the drainage water therethrough from the drainage passage means and supply the drainage water into the storage means, wherein the inlet is located at a position higher than the drainage passage means and lower than the drain portion.

2. A drainage system according to claim 1, wherein the pump means pumps the drainage water from a lowest portion of the drainage passage means.

3. A drainage system according to claim 1, wherein the storage means is an underground reservoir.

4. A drainage system according to claim 1, wherein a receiving volume of drainage water of the storage means is not less than a difference between a desired drainage water receiving volume required for the drainage system and a receiving volume of drainage water of the drainage passage means.

5. A drainage system according to claim 1, wherein the inlet is arranged above a bottom portion of the storage means to form a volume receiving the drainage water under the inlet in the storage means.

6. A drainage system according to claim 1, wherein the inlet is arranged on a bottom portion of the storage means to form a volume receiving the drainage water over the inlet in the storage means.

7. A drainage system according to claim 1, wherein the drainage system further comprises additional pump means for pumping the drainage water from the storage means.

8. A drainage system according to claim 1, wherein the drainage system further comprises valve means for allowing the drainage water to flow from the storage means to the drainage passage means.

9. A drainage system according to claim 6, wherein the drainage system further comprises additional inlet above the first mentioned inlet at an inner side of the inlet in the storage means so that the drainage water is maintained in the storage means by additional inlet at an inner side of the additional inlet when a level of the drainage water is lowered below the first mentioned inlet.

10. A drainage system according to claim 3, wherein the inlet communicates with the atmosphere at a surface of the ground.

11. A drainage system according to claim 1, wherein the pump means begins to pump the drainage water after a level of the drainage water from the drainage passage means reaches the inlet.

12. A drainage system according to claim 1, wherein the pump means begins to pump the drainage water after a level of the drainage water from the discharge passage means reaches the storage means.

13. A drainage system according to claim 8, wherein the valve means allows the drainage water in the storage means to flow into the drainage passage means before the pump means begins to pump the drainage water from the drainage passage means.

14. A drainage system according to claim 1, wherein the drainage system further comprises supplemental pump means for pumping the drainage water from the drainage passage means to the drain portion, and wherein the supplemental pump means pumps the drainage water from a position above where the first-mentioned pump means pumps the drainage water.

15. A drainage system according to claim 14, wherein the drainage system further comprises supplemental pump means for pumping the drainage water from the drainage passage means to the drain portion, and wherein the supplemental pump means pumps the drainage water from a position under the inlet.

* * * * *